United States Patent
Rani Surendranath

(10) Patent No.: US 11,945,743 B2
(45) Date of Patent: Apr. 2, 2024

(54) DESALINATION OF SALT WATERS BY SALT REPELLENT TECHNIQUE

(71) Applicant: Gopinath Rani Surendranath, Chennai (IN)

(72) Inventor: Gopinath Rani Surendranath, Chennai (IN)

( * ) Notice: Subject to any disclaimer, the term of this patent is extended or adjusted under 35 U.S.C. 154(b) by 0 days.

(21) Appl. No.: 16/964,598

(22) PCT Filed: Jun. 26, 2020

(86) PCT No.: PCT/IB2020/056051
§ 371 (c)(1),
(2) Date: Jul. 24, 2020

(87) PCT Pub. No.: WO2021/144624
PCT Pub. Date: Jul. 22, 2021

(65) Prior Publication Data
US 2023/0159364 A1    May 25, 2023

(30) Foreign Application Priority Data

Jan. 13, 2020  (IN) .............................. 202041001360

(51) Int. Cl.
*C02F 9/00*        (2023.01)
*B01D 9/00*        (2006.01)
(Continued)

(52) U.S. Cl.
CPC .............. *C02F 9/00* (2013.01); *B01D 9/0009* (2013.01); *B01D 9/0013* (2013.01); *B01D 9/005* (2013.01);
(Continued)

(58) Field of Classification Search
None
See application file for complete search history.

(56) References Cited

U.S. PATENT DOCUMENTS

| 4,092,834 A | 6/1978 | Lloyd | B01D 9/04 62/123 |
| 8,696,916 B2 | 4/2014 | Buchsbaum | |
| 2015/0047388 A1 | 2/2015 | Brodt | C02F 1/22 62/536 |

FOREIGN PATENT DOCUMENTS

| CA | 2159652 | 4/1997 |
| GB | 1467171 | 3/1977 |

OTHER PUBLICATIONS

Xie, et al., "Study on sea ice desalination technology," Desalination 245 (2009), p. 146-154 (Year: 2009).*

* cited by examiner

*Primary Examiner* — Chester T Barry

(57) ABSTRACT

A novel Salt Repellent Technique is presented to remove all inorganic salts from seawater to get potable water. The repellent additives recommended throws out all salts of sodium, magnesium, calcium, potassium and the like ions from seawater and paves way to get salt free potable water. The conventional washing of ice crystals is completely avoided due to the presence of additives. This technique helps to remove last traces of salts from seawater and analogous waters, without undertaking the conventional washing process. The new salt repellent process assures of high water recovery, ease of operation, lesser pollution, smaller plants, simpler machinery and technology, lower energy cost, nil or lesser pre-treatment and recovery of valuable by-products. To reduce the TDS still lower, it is recommended to have a simplified reverse osmosis unit in addition, as a post-operative arrangement.

10 Claims, 2 Drawing Sheets

(51) Int. Cl.
*C02F 1/00* (2023.01)
*C02F 1/20* (2023.01)
*C02F 1/22* (2023.01)
*C02F 1/38* (2023.01)
*C02F 1/68* (2023.01)
*C02F 101/10* (2006.01)
*C02F 103/00* (2006.01)
*C02F 103/06* (2006.01)
*C02F 103/08* (2006.01)
*C02F 103/32* (2006.01)
*C02F 103/36* (2006.01)

(52) U.S. Cl.
CPC ............... *C02F 1/004* (2013.01); *C02F 1/20* (2013.01); *C02F 1/22* (2013.01); *C02F 1/38* (2013.01); *C02F 1/68* (2013.01); *C02F 2101/10* (2013.01); *C02F 2103/007* (2013.01); *C02F 2103/06* (2013.01); *C02F 2103/08* (2013.01); *C02F 2103/327* (2013.01); *C02F 2103/365* (2013.01)

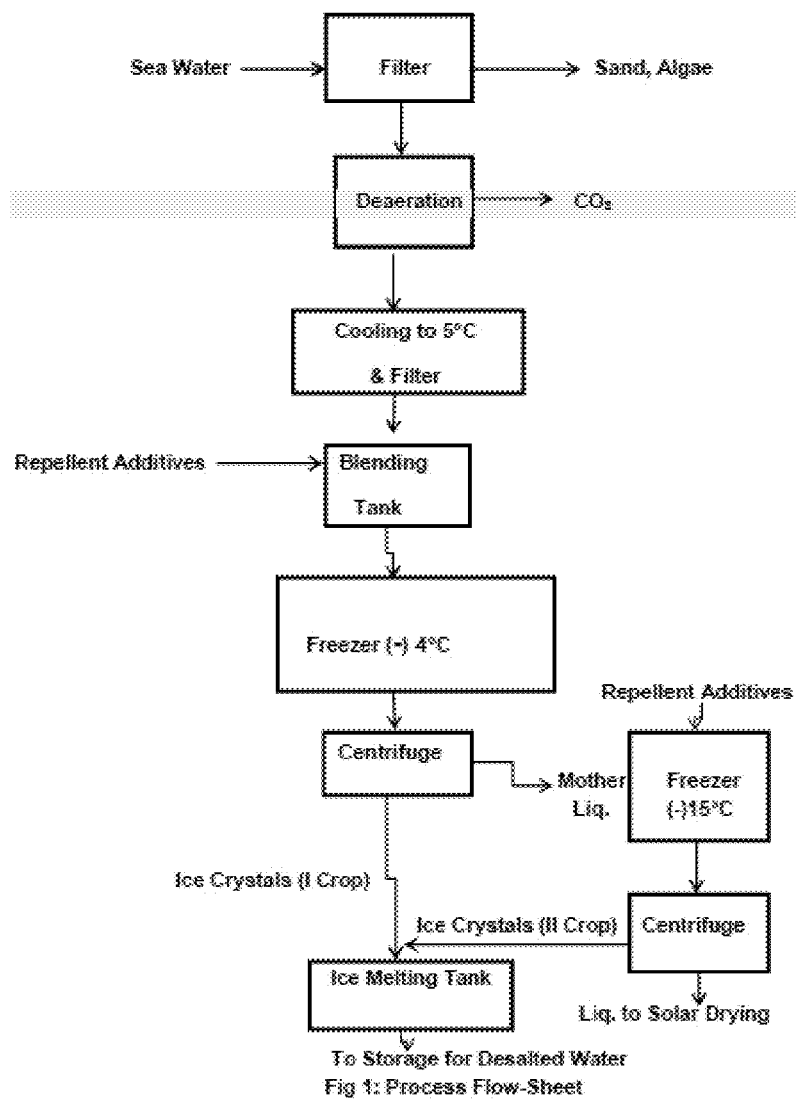
Fig 1: Process Flow-Sheet

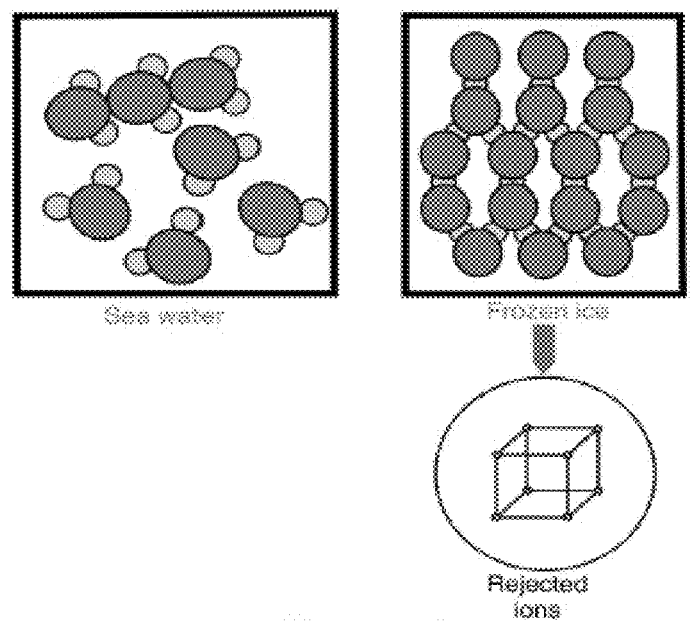
Fig 2: Salt Rejection Process

DESALINATION OF SALT WATERS BY SALT REPELLENT TECHNIQUE

FIELD OF THE INVENTION

The objective of the invention is to develop a cost effective process to desalt sea water, as an alternative to existing desalination methods and to extend the technology to other polluted waters.

BACKGROUND OF INVENTION

Water is elixir of life and all living cells require water for their survival. It is one of the most important materials on earth because no life can survive without water. All plants, animals, marine organisms and all living cells cannot survive for long time without good quality potable water. In recent times, the availability of potable water is dwindling and there is urgent need to augment the fresh water. Of the total water available in the world, 97% of water is in the sea, 2% of water is frozen as ice and the remaining 1% only is suitable for human consumption. The demand for fresh water increases year after year due to increase in population, draught, increased demand from industries and agriculture. While the demand is ever increasing, the availability of water is shrinking all over the world due to various reasons. It is estimated that by the year 2025, around 65% of world population will be living under severe water shortage. Hence a permanent solution has to be worked out. The best method to meet the water shortage is that of Rain water harvesting. But there is failure of monsoon many times and the water shortage remains acute.

Sea water contains about 3.5% salt, which are present as ions. The six most abundant ions of seawater are sodium, chloride, sulfate, magnesium, calcium and potassium. The amount of these salts in seawater varies because of the addition or removal of water due to precipitation (rain) and evaporation. Consequently, salinity of sea water varies over the season, being lower in rainy season and higher during hot summer months. The salt content in sea water varies from 0.7% in Baltic Sea to 6.0% in Red Sea, the average being 3.5% in most of the marine areas. Typical composition of sea water in different parts of the world is furnished below:

| Chemical Composition of Sea water (mg/lit) | | | | |
|---|---|---|---|---|
| Chemical ion present | Bay of Bengal water at Chennai | Red Sea Water at Jeddah | Arabian Gulf water at Kuwait | Av. Sea Water |
| Chloride | 18813 | 22200 | 23000 | 19353 |
| Sodium | 13630 | 14300 | 15850 | 10760 |
| Magnesium | 1423 | 740 | 1770 | 1292 |
| Sulphate | 410 | 3100 | 3200 | 2713 |
| Calcium | 406 | 230 | 500 | 412 |
| Potassium | 315 | 210 | 460 | 399 |
| Bicarbonate | 140 | 150 | 140 | 610 |

Desalination by distillation and Reverse Osmosis are well established technologies but has severe limitations due to environmental pollution and higher cost of the processed water. A number of studies and patents have been filed covering both distillation and RO process. Yet other modes of Desalination process such as Freeze Desalination, ion exchange process, electro dialysis and the like are being suggested to reduce the environmental pollution.

GB1467171 gives details of an apparatus and method for purifying contaminated waste waters by freezing and washing the crystalline ice.

US 20150047388 describes a desalting process having washing column with alternative layers of water and immiscible liquids to separate the salts in brine.

CA 2159652 uses a dual process of removing salts by RO in the first stage and treats outflowing brine by freezing and avoids freeze-up troubles.

U.S. Pat. No. 4,092,834 describes a Freeze separation plant wherein the salts are washed away by mixing it with an immiscible secondary refrigerant and washing the brine to reduce salt content in ice.

U.S. Pat. No. 8,696,916 describes a process wherein a fluid having an intermediate density between ice and brine is introduced to separate them in a flotation tower.

In all the above process, washing of ice crystals were carried out to remove the last traces of salts in the ice. Washing of ice dissolves simultaneously both ice and salts and reduces yield of ice. Hence there is a need to work out a process to separate all salts from ice so that pure ice is obtained. It was also necessary to avoid washing step to reduce process loss and to improve the yield of water.

As indicated above, the existing inventions are not able to overcome the problem of separating last traces of salt from ice completely. Further the process followed is cumbersome, pollutes the eco-system and are not cost effective. Thus, there is a need for the present invention to overcome the above mentioned problems.

OBJECTIVE OF THE INVENTION

The main objective of this invention is to identify a process which will remove sodium chloride and all other salts from sea water and analogous waters so that an everlasting and continuous amount of seawater will be available to all human beings which can be used uninterruptedly throughout the year.

Yet another objective of the present invention is to desalinate salt water to potable water in an economic beneficial manner.

Yet another objective of the present invention is that the invention creates lesser pollution to sea and this saves marine life.

Yet another objective of the present invention is that the invention can be used to recover all mineral salts from the concentrated brine.

Yet another objective of the present invention is that the invention does not use any expensive reverse osmosis membranes or Boilers.

Yet another objective of the present invention is that the invention can be used to recover additional quantity of water from outgoing streams of reverse osmosis plants as well as to reduce salt content in outgoing brines.

Yet another objective of the present invention is that the invention takes shorter gestation period to install the plant.

Further objectives, advantages, and features of the present invention will become apparent from the detailed description provided herein below, in which various embodiments of the disclosed invention are illustrated by way of example.

SUMMARY OF THE INVENTION

The invention covers a method used for Desalination of Salt waters and its analogues by salt repellent technique and involves the following steps: The method includes filtering sea water, the filtered sea water is deaerated. The deaerated sea water is cooled and filtered. The filtered sea water is blended with a salt repellent additives and then freezed resulting in a freezed admixture. The freezed admixture is centrifuged to get a crystalline ice and a mother liquor separately. The crystalline ice is melted to get desalted water. The mother liquor is freezed with additional additives and centrifuged to get a second crop of ice crystals. The second crop of ice crystals are melted to get desalted water and the mother liquor obtained from second centrifuge is used to recover all types of dissolved minerals. Herein, the salt repellent additive contains a single chemical product or consists of a mixture of Surface active agents, amino acids, Alcohols, esters, ketones and chemical reagents. Herein, the salt water and its analogues includes sea water, brackish water, Brine, ground water, impure waters, industrial effluent waters, Lake waters, municipal waste water, polluted waters, Red sea water, River and other stream waters, salt waters, and all types of waters containing inorganic salts. The said salt repellent additives are selected from the group consisting of Surface active agents specifically including sodium lauryl sulphate, sodium lauryl ether sulphate and The powders of Water melon seeds containing amino acids, glutamic acid, aspartic acid, leucine, phenylalanine, arginine, glycine, proline, alanine either as powder or as liquid form in solvents and Glycols specifically including Ethylene glycol, propylene glycol, Poly Ethylene glycol, glycerine and Alcohols specifically including Isopropyl Alcohol, Ethyl Alcohol, Isobutyl Alcohol, Benzyl Alcohol and Esters specifically including Ethyl acetate, methyl acetate, butyl acetate, amyl acetate, benzyl acetate, Ethyl benzoate, Butyl butyrate, aceto acetate and Ketones specifically including Dihydroxy acetone, methyl ethyl ketone, propanone, aceto phenone, benzyl phenone, butanone and chemical Reagents specifically including Fructose, Silver nitrate, Sucrose, cyclo hexyl amine and propyl amine. The salt repellent additives are used either separately or/and as an individual chemical compound, alone or as admixtures of various combinations of additives and of various concentrations to get crystalline ice and process them further to get desalted water. The said sea water covers all types of water containing inorganic salts present as ions in liquid water, such as sea water, brine, salt water, river water, canal water, municipal waste water, Brackish water, polluted industrial waters, waste waters from dairy, leather, mining industries, oil refinery, alcoholic beverages, coffee, tea, orange juice, water in utility industries containing dissolved salts of sodium, potassium, calcium, magnesium, halides, carbonates, bicarbonates, sulphates and the like. The said additive is added in an additive concentration of 0.005% to 20% of feed water used. The said sea water or the analogous waters and the additives are blended at a temperature of (−)30° C. to 70° C. The said additive consists of a mixture of sodium lauryl sulphate, solution or powders of water melon seed, Isobutyl Alcohol, glycerine, butyl acetate, propanone, methyl ethyl ketone and Silver nitrate, Sucrose, cyclo hexyl amine and propyl amine either alone or all of them or any combination mixture of above said additives with an additive concentration of 0.005% to 20% of feed water used and carried out between (−)30° C. to 30° C. The salt free ice crystals are produced without washing the crystals or by adopting washing free process or washing less process by using the salt repellent additives, indicated above. The steps are carried out in batch process or as continuous process and the operating pressure varies from sub-atmospheric to atmospheric and higher atmospheric pressures. The crystallization is done by direct freeze crystallisation alone and or indirect freeze crystallization methods. The processes of refining and extracting the mother liquor are used to recover all or any of the individual elements present in the sea water or the feed waters.

The main advantage of the present invention is to Desalinate seawater to get potable water without washing the ice obtained in the process and to gain economic benefits.

Yet another advantage of the present invention is that the invention creates lesser pollution to sea and this saves marine life.

Yet another advantage of the present invention is that the invention does not require intensive pre-treatment.

Yet another advantage of the present invention is that the invention does not use any expensive reverse osmosis membranes or Boilers.

Yet another advantage of the present invention is that the invention can be used to recover additional quantity of water from outgoing streams of reverse osmosis plants as well as to reduce salt content in outgoing brines.

Yet another advantage of the present invention is that the invention takes shorter gestation period to install the plant.

Yet another advantage of the present invention is that the invention can be used to recover all mineral salts from the concentrated brine.

Further objectives, advantages, and features of the present invention will become apparent from the detailed description provided herein below, in which various embodiments of the disclosed invention are illustrated by way of example.

BRIEF DESCRIPTION OF THE DRAWINGS

The accompanying drawings are incorporated in and constitute a part of this specification to provide a further understanding of the invention. The drawings illustrate one embodiment of the invention together with the description, serve to explain the principles of the invention.

FIG. 1 illustrates the flowchart of the desalting process as per the above invention.

FIG. 2 illustrates the Salt Rejection Process.

DETAILED DESCRIPTION OF THE INVENTION

Definition

The terms "a" or "an", as used herein, are defined as one or as more than one. The term "plurality", as used herein, is defined as two as or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended. The term "comprising" is used interchangeably used by the terms "having" or "containing".

For simplicity sake, throughout this patent, the following nomenclature is used. The term "saline water" includes terms like "salt water" and "brine" and in a broad sense to denote the entire range of salt-fluid combinations including, but not limited to, sodium chloride containing solutions, aqueous solutions of dissolved mineral salts, for example, halides, carbonates and sulphates of sodium, potassium, calcium, magnesium salts, and combinations or mixtures of these salts, and combinations or mixtures of fluids and materials of inorganic salts.

The word "water" and "salt waters" in this patent is used to cover all types of water and includes sea water, polluted industrial waters, waste waters from industries, mines, oil refinery, leather processing, dairy industry and water streams containing Alcoholic beverages, orange juice, coffee, tea and the like.

The term "desalination" shall be understood to include separation of the components of saline water. For the purposes of this patent, the term Desalt water and desalinated water denotes the same product and are used interchangeably.

The word Sodium Chloride is used to include Sodium Chloride as well as all other inorganic salts present in sea water, as well as the salt waters emanating from industry and different other sources.

The word TDS indicates 'Total Dissolved Solids', expressed in mg/lit.

The word RO stands for 'Reverse Osmosis'.

Reference throughout this document to "one embodiment", "certain embodiments", "an embodiment", "another embodiment", and "yet another embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics are combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

As used herein, the term "one or more" generally refers to, but not limited to, singular as well as the plural form of the term.

The drawings featured in the figures are to illustrate certain convenient embodiments of the present invention and are not to be considered as a limitation to that. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

The present invention relates to a method used for Desalination of Salt waters and its analogues by salt repellent technique. The method includes the following steps: Filtering sea water, the filtered sea water is deaerated. The deaerated sea water is cooled and filtered. The filtered sea water is blended with a salt repellent additives and then freezed resulting in a freezed admixture. The freezed admixture is centrifuged to get a crystalline ice and mother liquor separately. The crystalline ice is melted to get desalted water. The mother liquor is freezed with additional additives and centrifuged to get a second crop of ice crystals. The second crop of ice crystals are melted to get desalted water and the mother liquors obtained from second centrifuge is used to recover all types of dissolved minerals. Herein, the salt repellent additive contains a single chemical product or consists of a mixture of Surface active agents, amino acids, Alcohols, esters, ketones and chemical reagents. Herein, the salt water and its analogues includes waters containing inorganic salts from sea water, brackish water, Brine, ground water, impure waters, industrial effluent waters, Lake waters, municipal waste water, polluted waters, Red sea water, River and other stream waters, salt waters, and all types of waste waters containing inorganic salts.

In a preferred embodiment the said salt repellent additives are selected from the group consisting of Surface active agents specifically including sodium lauryl sulphate, sodium lauryl ether sulphate and the powders of Water melon seeds containing amino acids, glutamic acid, aspartic acid, leucine, phenylalanine, arginine, glycine, proline, alanine either as powder or as liquid form in solvents and Glycols specifically including Ethylene glycol, propylene glycol, Poly Ethylene glycol, glycerine and Alcohols specifically including Isopropyl Alcohol, Ethyl Alcohol, Isobutyl Alcohol, Benzyl Alcohol and Esters specifically including Ethyl acetate, methyl acetate, butyl acetate, amyl acetate, benzyl acetate, Ethyl benzoate, Butyl butyrate, aceto acetate and Ketones specifically including Dihydroxy acetone, methyl ethyl ketone, propanone, aceto phenone, benzyl phenone, butanone and chemical Reagents specifically including Fructose, Silver nitrate, Sucrose, cyclo hexyl amine and propyl amine. The salt repellent additives are used either separately or/and as an individual chemical compound, alone or as admixtures of various combinations of additives and of various concentrations to get crystalline ice and process them further to get desalted water.

In another embodiment the said sea water covers all types of water containing inorganic salts present as ions in liquid water, such as sea water, brine, salt water, river water, canal water, municipal waste water, Brackish water, polluted industrial waters, waste waters from dairy, leather, mining industries, oil refinery, alcoholic beverages, coffee, tea, orange juice, water in utility industries containing dissolved salts of sodium, potassium, calcium, magnesium, halides, carbonates, bicarbonates, sulphates and the like. In the present invention, the said additive is added in an additive concentration of 0.005% to 20% of feed water used.

In the preferred embodiment, the said sea water or the analogous waters and the additives are blended at a temperature of $-25°$ C. to $70°$ C. The said additive consists of a mixture of sodium lauryl sulphate, solution or powders of water melon seed, glutamic acid, Isobutyl Alcohol, glycerine, butyl acetate, propanone, methyl ethyl ketone and Silver nitrate, cyclo hexyl amine either alone or all of them or any combination mixture of above said additives with an additive concentration of 0.005% to 20% of feed water used and carried out between $-30°$ C. to $30°$ C. The salt free ice crystals are produced without washing the crystals or by adopting washing free process or washing less process by using the salt repellent additives, indicated above.

In another embodiment, the steps are carried out in batch process or as continuous process and the operating pressure varies from sub-atmospheric to higher atmospheric pressures. The crystallisation is done by Direct freeze crystallisation and/or indirect freeze crystallization methods. The processes of refining and extracting the mother liquor are used to recover all or any of the individual elements existing in the sea water or the feed waters, present due to their soluble property in water.

Process Details:

The freeze Desalination method suggested herein starts with freezing sea water by controlled cooling, (includes nucleation, ice formation, crystal growth and salt rejection), centrifuging ice slurry obtained and melting the ice.

Freezing and Ice Formation:

When ordinary water is cooled, it first freezes on the top surface and around the edges and due to surface tension, it forms ice crystals at the top and a small hole is left unfrozen on the top surface. As freezing advances, more and more ice builds up around the sides of the ice, building to a thicker ice block.

Brine Rejection:

Sea water contains water molecules and inorganic salts, all of them present as ions in water. The salts consist of the ions of sodium, magnesium, calcium, potassium, chlorides, sulphates, carbonates, bicarbonates and the like. They are in dissolved state due to their soluble property in water.

When water is cooled to 0° C., the solvent, liquid water molecules alone freezes as solidified ice and all other salt ions remain in liquid water, till it gets saturated in the remaining liquid water. When more and more solvent water is removed as solid ice crystals, at one stage, such saturated salt ions are thrown out from the remaining water. This is known as Brine/salt rejection. A schematic diagram of salt rejection is depicted in FIG. 2.

As ice formation progresses in the sea, systematic increase in salinity with depth can be noticed and it will be 0% at the surface and about 4% at the bottom of ice. The salt rejection occurs from top to bottom due to gravity flow of salty brine.

On further cooling, the solidified ice takes a hexagonal structure as shown in FIG. 2 and forms a cage like structure while salts like Sodium Chloride take cubical structure and other salts take their respective crystal structures. The structural difference of ice and other salts are so much different in that they do not fit well into the hexagonal structure of ice.

As the temperature further lowers to freezing point, all the external sides of ice crystals are sealed and all those salts which do not fit in the hexagonal structure of ice are squeezed out while those salts which are compatible by structure or smaller size get accommodated, and continue to stay in the brine pockets.

Thus as freezing advances, the salt ions are rejected from the lattices of ice structure and they are either forced out (into the surrounding water), or they are trapped within the ice crystals in pockets. The squeezing and rejection of salt occurs at molecular level and at ice crystal formation stage.

As some salt ions co-exist with water molecules at the molecular level, they cannot be removed by external washing of ice crystals by water. Such washings of external surface of ice, removes only a portion of salts held at the surface of ice crystals and it does not and cannot remove salt ions held in ice pockets. It is for this reason that the mechanically shredded ice flakes do not give desalted water while one can get desalted water from ice flakes only when the salt present in ice pockets are driven out. Such removing of ions held in pockets is accelerated by the presence of repellent additives recommended in this patent.

If complete removal of salt is desired, there needs to have additives which repel all salt ions of any shape and size, completely from the water molecules. These repellent additives when present along with brine at the nucleation stage will not allow Sodium Chloride and other salt ions to remain in the brine at freezing temperature and if they are present, they will be squeezed out of the water molecules. By this method, one can force all salt molecules to get away from ice molecules, which will eventually reduce the salinity of water.

In other words, to get potable water, Sodium Chloride and other salts should not co-exist with water molecules and this is facilitated by the addition of salt repellents and if such salt repellent additives are present at the time of nucleation of ice molecules, then the salt repellents will throw away all salt ions from the brine and allow water molecules alone to be in the system.

A list of salt repellent additives for Desalting sea water and all types of polluted waters has been identified by careful study and such additive mixtures consist of the following:

a. Surface active agents specifically including sodium lauryl sulphate, sodium lauryl ether sulphate and
   b. The powders of Water melon seeds containing amino acids, glutamic acid, aspartic acid, leucine, phenylalanine, arginine, glycine, proline, alanine either as powder or as liquid form in solvents and
   c. Glycols specifically including Ethylene glycol, propylene glycol, Poly Ethylene glycol, Glycerine and
   d. Alcohols including Isopropyl Alcohol, Ethyl Alcohol, Isobutyl Alcohol, Benzyl Alcohol and
   e. Esters specifically including Ethyl acetate, butyl acetate, amyl acetate, benzyl acetate, Ethyl benzoate, Butyl butyrate, aceto acetate and
   f. Ketones specifically including Dihydroxy acetone, methyl ethyl ketone, propanone, aceto phenone, benzyl phenone, butanone and
   g. Chemical Reagents including Silver nitrate, Fructose, Sucrose, cyclo hexyl amine and propyl amine and
   h. Any of the above individually or all combinations of mixture of above chemicals.

Each repellent additive is selected based on the type of ions present, physical properties of liquids and its concentration in water. These additives will be required to cater different types of polluted waters and some of them are alternatives or substitutes. As the water is used universally for human consumption, sufficient precaution has been taken to use them in small doses, not to interfere with the health of human lives.

The embodiment disclosed hereunder relates to a process for purifying impure waters, such as sea water, brine or other aqueous mixtures containing various inorganic salts, heavy metals, or other impurities through Salt Repellent Technique. The same processes can be used to reduce the water content in aqueous mixtures, such as to concentrate fruit juices, alcoholic beverages, instant coffee and tea among others.

The present invention is now explained with the help of experimental studies conducted by the inventor, which has been incorporated for explaining its best mode and are not intended to limit its scope.

All the experiments were carried out based on real sea water obtained at Chennai beach, India. The Total Dissolved Solids of the above sea water was found to be 36,850 ppm. The analysis of sea water used is presented in the Table given above. All the experiments were carried out using 1 to 2 liters of sea water for each batch. A commercial freezer was used for freezing the sea water, which takes 6 to 8 hours to freeze sea water from 30° C. to −4° C.

In a schematic experiment, sea water weighing 1500 grams was taken in a Pyrex beaker and was filtered in a Buchner funnel to remove sand, clay, algae and all suspended impurities. The filtered water was clear and transparent. It was put under vacuum to remove carbon dioxide and other dissolved gases in sea water. The degassed water was cooled to 5° C. and filtered through a 10 micron filter to remove all suspended impurities and lesser soluble salts.

In a separate set-up, about 120 grams of repellent additive mixture was prepared containing sodium lauryl sulphate, solution of water melon seed powder, glutamic acid, isobutyl Alcohol, ethyl alcohol, butyl acetate, methyl ethyl ketone, propanone, ethylene glycol, cyclo hexyl amine and glycerine and filtered through a Whatman 10 micron filter paper.

The clear filtered additive was blended thoroughly with the filtered sea water obtained above and was taken to a freezer. The clear solution was cooled to −4° C., when nucleation of water molecules commences and a slushy ice was obtained over a period of time. The slush contains nearly 60% of ice as solid crystals. While ice was well frozen in the outer periphery, it remained to be loose crystals at the central core with voids in between the ice crystals.

The ice brine slurry as obtained above was centrifuged in a high speed SS centrifuge when ice and brine were separated completely. Centrifuging was done for 5 minutes at 1500 rpm when all liquid brine was thrown out, leaving behind ice crystals in a dry state on the filter media.

The ice crystals were transparent, tasteless and easily crumble in hand. The crystals were warmed to get pure potable water. The product was tested and had a TDS of 460 mg/lit. The yield of water was 42%.

The Salt rejection efficiency is calculated as follows:

$$\text{Salt rejection efficiency} = (TDS_{feed\ sea\ water} - TDS_{Desalted\ sea\ water})*100)/TDS_{feed\ seawater} = ((36850-460)*100/36850)) = 98.75\%.$$

Thus the salt rejection was found to be at 98.75%. It may be noted that:

a. No washing of ice crystal was done at any stage to get high purity water and
b. Above yield of water was achieved in a Single Stage of freezing operation This is claimed as the novelty of the invention. The Salt Repellent Technique submitted herein has never been conceived by any scholar which gives tremendous benefits in terms of simplicity, purity and higher yields.

The yield and purity of desalted water varies as per the salt content in feed water and process variables. In most of the experiments, the yield of water varies from 30% to 45%, with an average yield of 40%. Similarly the TDS of water obtained varies between 350 ppm to 900 ppm with an average TDS of 460 ppm. To reduce the TDS still lower, it is recommended to have a Reverse Osmosis unit in addition, as a post-operative dual process.

It may be noted that the TDS of water recommended by WHO is 500 ppm while WHO has allowed up to a TDS value of 2000, without harmful effect on health.

II Stage of Crystallisation:

As the mother liquor from centrifuge contains further quantity of extractable water, another freezing step was carried out to recover and increase the yield of water. At this stage, the mother liquor had higher concentration of salts and consequently there may be depression in freezing point. Hence some more nucleation additives were added and cooled further to (−)15° C. and held at this temperature for another 4 to 8 hours so as to freeze further quantity of water to ice crystals. It was centrifuged and Second crop of ice crystals were harvested. The spent mother liquor from the Second stage of centrifuging was sent for solar drying to recover Sodium Chloride and other mineral salts. FIG. 1 is the flowchart of the desalting process as per the above invention.

Freezing of the sea water can be done by direct contact freezing or by indirect freezing. Refrigerants like ammonia, Freon, liquefied nitrogen gas, liquefied natural gas, liquefied petroleum gas, dry ice and the like may be used for freezing sea water. The Salt repellent technology given above has shown to be a better option when compared with other desalination technologies, in terms of purity of water, higher yield, ease of operation, least pollution, absence of washing step, lesser pre-treatment, smaller size of plants, lower energy required and cleaner by-products.

While the invention herein disclosed has been described by means of specific embodiments, numerous modifications and variations could be made thereto by those skilled in the art without departing from the scope and spirit of the invention set forth in the claims.

I claim:

1. A method for desalination of salt water and its analogues by salt-repellent technique, comprising the following steps:
   filtering sea water,
   deaerating the filtered sea water,
   cooling and filtering the deaerated sea water,
   blending the clear deaerated filtered cold sea water with a salt-repellent additive,
   freezing the blended mixture to obtain a frozen admixture,
   centrifuging the frozen admixture to separate crystalline ice and mother liquor, melting the crystalline ice to obtain the first crop of desalted water,
   freezing the mother liquor with additional salt-repellent additives,
   centrifuging the frozen mother liquor to obtain a second crop of ice crystals, melting second crop of ice crystals to obtain a second crop of desalted water, sending the mother liquor obtained from the second centrifugation to recover all types of dissolved minerals,
   wherein, the salt-repellent additive contains a single chemical product or consists of a mixture of surface-active agents, amino acids, alcohols, esters, ketones and chemical reagents, wherein the salt water and its analogues include waters containing inorganic salts from sea water, retentate water of reverse osmosis unit, nano water, produced water, brackish water, brine, ground water, impure waters, industrial effluent waters, lake water, municipal waste water, polluted water, Red Sea water, river or other stream water, salt water, and all types of waste water containing inorganic salts.

2. The method as claimed in claim 1, wherein the salt-repellent additive is selected from the group consisting of surface-active agents, including a sodium lauryl sulphate and sodium lauryl ether sulphate, and glycols such as ethylene glycol, propylene glycol, polyethylene glycol, glycerine and alcohols such as isopropyl alcohol, methyl alcohol, ethyl alcohol, normal butyl alcohol, isobutyl alcohol, benzyl alcohol, and esters such as ethyl acetate, methyl acetate, butyl acetate, amyl acetate, benzyl acetate, ethyl benzoate, butyl butyrate, acetoacetate, and ketones such as dihydroxyacetone, methyl ethyl ketone, propanone, acetophenone, benzyl phenone, and butanone and chemical such as fructose, silver nitrate, sucrose, cyclohexylamine, and propylamine.

3. The method as claimed in claim 1, wherein the salt-repellent additive is used either separately as an individual chemical compound or as mixtures of various combinations of additives and at various concentrations to obtain crystalline ice and desalted water and the mother liquor obtained is processed to recover all or any one of the individual elements such as lithium, cobalt, gold, rare earths and other elements present in the sea water or the saline water.

4. The method as claimed in claim 1, wherein the term "sea water" and its analogues covers all types of water containing inorganic salts present as ions in liquid water, such as sea water, retentate water of reverse osmosis unit, nano water, brine, salt water, river water, canal water, municipal waste water, brackish water, polluted industrial water, and waste water from dairy, leather, mining industries, produced water of oil refineries, water from industries manufacturing alcoholic beverages, coffee, tea, orange juice, and utility industries containing dissolved salts of sodium, potassium, calcium, magnesium, halides, carbonates, bicarbonates, sulphates, borates, fluorides and other ionic compounds.

5. The method as claimed in claim 1, wherein the salt-repellent additive is added in concentrations ranging from 0.005% to 20% of the saline water used.

6. The method as claimed in claim 1, wherein the sea water or analogous waters and the additives are blended at temperatures ranging from −20° C. to 70° C.

7. The method as claimed in claim 1, wherein by using the salt-repellent technique, salt-free ice crystals are produced without the need for washing the crystals due to the use of a salt-repellent additive selected from the group consisting of surface-active agents, including sodium lauryl sulphate, sodium lauryl ether sulphate, and glycols such as ethylene glycol, propylene glycol, polyethylene glycol, glycerine and alcohols such as isopropyl alcohol, methyl alcohol, ethyl alcohol, normal butyl alcohol, isobutyl alcohol, benzyl alcohol, and esters such as ethyl acetate, methyl acetate, butyl acetate, amyl acetate, benzyl acetate, ethyl benzoate, butyl butyrate, acetoacetate, and ketones such as dihydroxyacetone, methyl ethyl ketone, propanone, acetophenone, benzyl phenome, and butanone and chemical reagents such as fructose, silver nitrate, sucrose, cyclohexylamine, and propylamine.

8. The method as claimed in claim 1, wherein all the steps can be carried out in a batch process or as a continuous process, and the operating pressure can vary from sub-atmospheric to higher than atmospheric pressure.

9. The method as claimed in claim 1, further comprising crystallization through direct freeze crystallization, indirect freeze crystallization or a combination of both methods.

10. The method as claimed in claim 1, wherein the salt-repellent technique is used to repel all or any one element present in sea water or analogous water.

* * * * *